United States Patent [19]

Briggs et al.

[11] Patent Number: 4,476,181

[45] Date of Patent: Oct. 9, 1984

[54] DELAMINATED VERMICULITE COATED ALUMINUM

[75] Inventors: Peter J. Briggs, Cheadle Hume; Kevin McAloon, Appleton Thorn; Graham R. Rideal, Handbridge, all of England

[73] Assignee: Imperial Chemical Industries Limited, London, England

[21] Appl. No.: 479,111

[22] Filed: Mar. 28, 1983

Related U.S. Application Data

[63] Continuation of Ser. No. 281,036, Jul. 7, 1981, abandoned.

[30] Foreign Application Priority Data

Jul. 11, 1980 [GB] United Kingdom ............... 8022714

[51] Int. Cl.³ ............................................. B32B 1/00
[52] U.S. Cl. ........................... 428/220; 106/18.12; 428/450; 428/457; 428/920; 428/921
[58] Field of Search ............ 428/457, 920, 921, 220, 428/450; 106/18.12

[56] References Cited

U.S. PATENT DOCUMENTS

| | | | |
|---|---|---|---|
| 3,018,186 | 1/1962 | Jenkins | 106/291 |
| 3,076,546 | 2/1963 | Ziegler et al. | 209/2 |
| 3,325,340 | 6/1967 | Walker | 161/168 |
| 3,356,611 | 12/1967 | Walker et al. | 252/28 |
| 3,455,850 | 7/1979 | Saunders | 106/18.15 |
| 3,466,322 | 9/1969 | Elam | 260/481 |
| 4,130,687 | 12/1978 | Ballard et al. | 428/310 |
| 4,258,074 | 3/1981 | Grimm et al. | 427/4 |
| 4,269,628 | 5/1981 | Ballard et al. | 106/291 |

FOREIGN PATENT DOCUMENTS

| | | |
|---|---|---|
| 1016385 | 1/1966 | United Kingdom . |
| 1072177 | 6/1967 | United Kingdom . |
| 1076786 | 7/1967 | United Kingdom . |
| 1119305 | 7/1968 | United Kingdom . |
| 120209 | 2/1969 | United Kingdom . |

*Primary Examiner*—Lorenzo B. Hayes
*Attorney, Agent, or Firm*—Cushman, Darby & Cushman

[57] ABSTRACT

An aluminum substrate comprising a layer of lamellae of a layer mineral, preferably vermiculite, in which substantially all of the lamellae are of size below 50 microns, production of the coating by applying a suspension of the lamellae to the substrate and removing the liquid from the suspension. The coating significantly upgrades the thermal insulation and fire performance of aluminum substrates even when only a few microns, for example below 50 microns and even below 10 microns, in thickness.

8 Claims, No Drawings

DELAMINATED VERMICULITE COATED ALUMINUM

This is a continuation of application Ser. No. 281,036, filed July 7, 1981, now abandoned.

This invention relates to inorganic coatings, and in particular to inorganic coatings comprising lamellae of layer minerals.

It is known that application to a substrate of a coating of an inorganic substance, for instance a layer mineral, improves the fire performance of the substrate. Various layer minerals have been proposed for the purpose, including the vermiculites, biotites and clays. Exfoliated vermiculite has been used, that is vermiculite flakes formed by heating vermiculite at elevated temperature, e.g. 800° C. In general, however, the coatings have not proved to be satisfactory, due mainly to the fact that when the coated substrate is exposed to a flame the coating affords no more than temporary protection of the substrate unless the coating is relatively thick, for example 0.1 mm or more. It is difficult to secure adequate adhesion of coatings, especially thick coatings, to substrates such as metals and the lack of adequate adhesion leads to bubbling, cracking and peeling of the coating, and hence to loss of protection of the substrate in a fire situation.

Improved coatings have been proposed, and in particular coatings which adhere more strongly to substrates even when exposed to a fire situation and enable thinner coatings to achieve a degree of fire-protection of substrates, based on vermiculite by using coatings formed of chemically delaminated vermiculite, that is vermiculite which has been delaminated into small flakes by treatment with one or more ionic salts, swelling in water and the application of shear to the swollen vermiculite in water (as opposed to exfoliated vermiculite). However, whilst the hitherto-proposed use of delaminated vermiculite undoubtedly results in improved coatings for protection of substrates against fire (particularly against flame), the coatings produced still afford little more than temporary fire protection and have not achieved any commercial significance.

The present invention resides in improved coatings for the fire-protection of substrates based on chemically delaminated vermiculite and on other delaminated layer minerals.

According to the present invention there is provided an inorganic coating for a substrate which significantly upgrades the fire-performance of the substrate even when of thickness only a few microns and which comprises a layer of lamellae of a layer mineral in which substantially all of the lamellae are of size below 50 microns.

Preferably the coating comprises vermiculite lamellae and especially preferred are coatings derived from suspensions of vermiculite lamellae produced using n-alkylammonium salts and wet classified after production to remove all particles of size greater than 50 microns.

By "vermiculite" we mean all materials known mineralogically and commercially as vermiculite, including the chlorite-vermiculites.

By the term "lamellae of a layer mineral" we mean tiny particles of the layer mineral obtained by chemically delaminating the layer mineral into very thin flaky particles or platelets having a high aspect ratio (length or breadth divided by thickness). Thus for example vermiculite lamellae are tiny, thin platelets obtained by chemical delamination of vermiculite and having a thickness of less than 0.5 micron, usually less than 0.05 micron and preferably less than 0.005 micron, and having a high aspect ratio of at least 100, preferably at least 1000, for example up to 10000. The lamellae of other layer minerals are of similar dimensions.

For forming the coatings of the present invention we prefer to employ suspensions of lamellae of layer minerals containing a high proportion of particles or platelets (lamellae) of size below 5 microns. Such suspensions, obtained by wet-classification of the suspensions obtained by chemical delamination of layer minerals, exhibit colloidal properties and result in especially desirable coatings exhibiting consistent physical properties. Suspensions of vermiculite lamellae wet-classified to a particle size below 50 microns may comprise 40% to 50% by weight of particles in the size range 0.4 to 5 microns. By wet-classifying the suspension to a lower maximum particle size, e.g. 20 microns, the % age of fine particles (below 5 microns) in the suspension can be increased; in general however we have found that classification to below 50 microns is adequate for most practical purposes.

Thus the preferred coatings according to the invention comprise vermiculite lamellae and are derived from suspensions of vermiculite lamellae classified to particles below 50 microns and containing particles of which at least 35%, preferably at least 40% by weight, have a maximum dimension in the size range 0.4 micron to 5 microns.

The coatings of the invention are conveniently formed by applying a suspension of lamellae to a substrate and removing the liquid from the suspension, usually by evaporation. The suspension normally will be aqueous, although suspensions of lamellae in non-aqueous media such as organic liquids are known and may be used if desired. The temperature at which the carrier liquid is removed from the suspension is not critical and can be any temperature up to the boiling point of the liquid. A suitable technique for removing the carrier liquid is to allow the liquid to evaporate at ambient (room) temperature, say overnight, and then heat the coated substrate to effect final removal of the carrier liquid.

Any convenient technique may be employed for applying the coating to the substrate, for example painting (brushing), spraying, immersion, dip-coating, roller-coating, spreading, doctoring and impregnation. The technique employed will depend upon several factors such as the flexibility of the substrate, the permeability of the substrate to the suspension (carrier liquid), the viscosity of the suspension and the desired thickness of the resulting coating, but it is a simple matter for the operator to choose a technique appropriate to applying a desired coating to a given substrate.

The concentration of lamellae in the suspension used to form the coatings, and hence the viscosity and rheology properties of the suspension, may vary within wide limits, depending to some extent at least upon the thickness of coating desired and the porosity of the substrate. If desired thick coatings can be built-up by applying several thin layers of the suspension. Suspension concentrations may vary from as little as 1 or 2% of lamellae for producing extremely thin coatings, e.g. coatings of sub-micron thickness to as high as 40 or 50% of lamellae for producing thicker coatings, e.g. coatings of several microns thickness. Moreover, as is described hereinafter, the suspension may contain additional materials suspended in or dissolved in the carrier liquid which will affect the viscosity and rheology properties of the suspensions and hence the optimum lamellae content of the suspension for producing a desired coating thickness. Examples of such additional matters include strength-improving agents, water-stability improving agents, water-proofing agents, flame-retardants and soluble polymers such as polyvinyl alcohol and polyacrylates.

A wide variety of substrates may beneficially be provided with a coating according to the invention, including porous, permeable and non-porous substrates. Examples of substrates which may advantageously be coated are metals such as steel and aluminium (plate, sheet or foil), wood, organic polymers and plastics (sheets, films and foams), glass sheet, paper and cementitious materials. In all cases the fire-performance and particularly the fire-resistance of the substrate is enhanced. Thus for example substrates which melt or are plastically deformed in a fire, e.g. metals such as aluminium and steel, glass and some polymers and plastics are upgraded to higher fire-resistance such that they melt or deform at higher flame temperatures and moreover even when melted or softened they do not flow and drip away from a flame but remain in the flame. Substrates which are flammable, e.g. wood and the majority of organic polymers and plastics, are upgraded so as to be fire-resistant, in particular so as to be resistant to the spread of flame even if the substrate is burned or damages at the point of contact by a flame; the substrate may in fact be burned to char at the point of contact by a flame but even so the coating remains intact and burning is confined to a small area local to the flame.

The extent to which the fire-performance of a substrate is upgraded will depend upon the thickness of the coating applied to it, being in general higher the thicker the coating. When the coated substrate is subjected to a flame or to high temperature conditions, the coating layer, being a poor thermal conductor, tends to maintain the substrate at a lower temperature than the applied conditions, and clearly the thicker the coating the greater will be the degree of thermal insulation afforded by the coating. However a valuable feature of the invention is the need for only very thin coatings, for example sub-micron coatings or at least coatings of thickness below 50 microns, for example below 5 or 10 microns, and it is in respect of such coatings that the valuable property of the coating in upgrading the fire-performance of substrates even when the substrate is damaged or destroyed by the flames is most apparent.

As stated hereinbefore, vermiculite is the preferred layer material. The reason for this preference is that in addition to conferring good fire resistance and thermal performance to substrates vermiculite almost alone among the layer minerals exhibits excellent self-adhesion properties. Upon removal of the water (or other carrier liquid) from suspensions of vermiculite lamellae, the lamellae adhere together to form a relatively strong layer of vermiculite. The deposited vermiculite lamellae may act as an adhesive to bond the substrate to other materials, for example to form laminates. Coatings comprising vermiculite lamellae derived from suspensions which have been wet-classified to exclude particles greater than 50 microns are harder, more consistent and more vapour-impermeable than coatings derived from unclassified suspensions.

In addition to upgrading the fire resistance and high temperature performance of the substrate to which the coating layer of lamellae is applied, the coating affords the further advantage of conferring vapour-barrier characteristics on the substrate. Coatings and films deposited from suspensions of lamellae, especially vermiculite lamellae, have low vapour transmission coefficients, especially low water-vapour transmission coefficients such that the coatings of the invention can be used as barrier layers to inhibit the ingress of water vapour into materials such as foams (where the ingress of water can impair the insulation value of the foam on ageing) or water-degradable materials.

Coatings comprising lamellae on the substrates can be rendered even more flame-retardant by incorporating in them conventional flame-retardant additives such as halogenated compounds and phosphates. Thus for example flames can be inhibited from spreading over the surface of the coated substrate even though the area of the substrate closest to the flame may be burnt or melted within the coated material.

A still further advantage afforded by coating substrates with lamellae is that the coating is chemically inert and in particular is alkali resistant. Thus substrates which are not normally useable in alkaline or acidic environments, for example glass sheets or glass vessels, can be rendered suitable for such use. A specific embodiment of a coated substrate of the invention is constituted by alkali-resistant non-fibrous glass which comprises glass having thereon a coating of lamellae of a layer mineral, preferably vermiculite.

The coated substrates described hereinbefore and comprising unmodified coatings comprising lamellae of a layer mineral are useful materials for a wide variety of applications. However, in applications where the coated substrate is liable to be subjected to liquid water, it is preferred to modify the coatings to confer improved water-stability upon them. Unmodified coatings tend to disintegrate in liquid water; however, they are readily modified to make them stable in liquid water. Coatings comprising vermiculite lamellae can be made water stable by treatment with a solution, for example a saturated solution, of a magnesium salt such as magnesium chloride at elevated temperature or by incorporating a water-stability improver in the suspension of lamellae applied to form the coating, as is described, for example, in our European patent publication No. 0.009.310 Al. Suitable water-stability improvers are particulate compounds sparingly soluble in water and having a basic reaction in water, for example calcium oxide and magnesium oxide.

Magnesium oxide is the preferred water-stability improver and in addition to conferring water-stability to the coating, this additive enhances the strength of the coating. The amount of water-stability improver will usually be up to 15% by weight, typically 10%, based on the layer mineral.

Water-proofing of the coatings, as opposed to improving their stability in liquid water, can be effected by incorporating a silicone polymer precursor in the suspension of lamellae prior to application of the suspension to the substrate, and treating the coated substrate with an acidic gas in the presence of water to polymerize the precursor and form a silicone polymer in the coating. Such a water-proofing process is described in our co-pending patent application No. 8103459. Thus, for example, sodium methyl siliconate can be incorporated in the suspension and the resulting coated substrate treated with carbon dioxide in the presence of water (during drying of the coating or subsequent to drying the coating and re-wetting it). The amount of silicone polymer precursor added to the suspension will usually be up to about 5% by weight, typically about 2% by weight, based on the lamellae in the suspension.

Any suspension of lamellae of layer minerals may be used to form the coatings of the invention. Chemical delamination of layer minerals is well known and any of the known delamination processes may be employed, including the processes described for delaminating vermiculite in United Kingdom patent specifications Nos. 1,016,385; 1,076,786; 1,119,305; and 1,585,104 and by Baumeister and Hahn in "Micron" 7 247 (1976). Preferably, the suspension of chemically delaminated layer mineral is subjected to a wet-classification treatment in which larger particles of the mineral are removed, as is described in respect of suspensions of vermiculite lamellae in United Kingdom patent application No. 39510/76:51425/76, and corresponding German OLS No. 2.741.859. For use in the present invention, the suspension preferably is wet-classified to a particle size (platelets) below 50 microns, so that the suspension exhibits colloidal properties. Typical suspensions of vermiculite lamellae obtained by the process described in United Kingdom patent specification No. 1,585,104, wet-classified to particles of below 50 microns comprise about 40% of particles in the size range 0.4 to 5.0 microns. Such suspensions are the preferred suspensions for forming the coatings of the present invention.

The coated substrates of the invention can be used in any applications where the uncoated substrates are commonly employed, and additionally they enable particular substrates to be used in numerous applications where hitherto those substrates have been considered unusable because they exhibit unsatisfactory barrier or fire performance, for example they are flammable and/or low melting materials. Thermal insulation and fire-barrier uses hitherto considered the sole province of asbestos, ceramics and refractory materials are made available to less expensive, less specialist materials, whilst the specialist materials themselves are upgraded to even higher thermal duty and more stringent fire-protection uses.

The coated substrate may be incorporated as one layer of a laminated material or alternatively the substrate to which the coating is applied may be a laminated structure. Thus for example a laminate comprising rigid polyurethane foam faced with a sheet of aluminium or aluminium foil (as is conventional practice) can be provided with a coating according to the invention either by facing the foam with a pre-coated aluminium sheet or foil or by applying the coating to the aluminium facing of a pre-formed laminate. Lamination can be carried out using conventional adhesives, but in the case of substrates coated with vermiculite lamellae the vermiculite layer itself may be used as the sole adhesive for bonding the substrate to other materials to form the laminate. Thus for example aluminium sheet or foil coated with vermiculite lamellae can be bonded to foam using a suspension of vermiculite lamellae as adhesive; the sheet or foil coated with a suspension of the lamellae may be applied to the foam whilst the coating is still wet whereupon drying of the coating bonds the aluminium to the foam. It will be appreciated that materials other than foams may be faced with coated materials in the same way.

As described hereinbefore, the coating of lamellae may be beneficially applied to organic polymers and plastics materials. A particular embodiment of the invention in such a case arises where the organic substrate is in the form of pieces or beads which are subsequently glued or fused together to provide a desired article, e.g. polystyrene beads which are glued or fused together to form moulded products such as ceiling tiles. In such a case the coating of the present invention may be applied to the surface of the finished article or it may be applied to the surface of the individual beads or pieces used to form the article. Thus for example polystyrene beads can be individually coated with lamellae and the coated beads glued together to form an article such as a ceiling tile. The fire-performance of articles derived from lamellae-coated beads or pieces is even greater than that exhibited by articles coated with lamellae after the beads or pieces have been glued together. We especially prefer to coat the individual beads or pieces prior to glueing them together and to apply an additional coating to the article made from the beads or pieces. In the case where individual beads or pieces are coated prior to glueing them together, the coating on the beads or pieces whilst still wet may be used as the sole adhesive for effecting the glueing.

The invention is illustrated but in no way limited by the following examples in which the following general procedure was used to prepare the vermiculite suspensions.

Preparation of Vermiculite Suspensions 150 parts of vermiculite ore (Mandoval micron grade ex-South Africa) are agitated with saturated sodium chloride solution in 1:2 ratio in a tank for 30 minutes at 80° C. The suspension is then centrifuged and washed with deionised water. The wet cake is transferred to a second tank where the vermiculite is stirred with 1.5N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling the suspension is approximately 20% solids and the particles random sized in the range 300-400 micron. This suspension is then passed through a stone-type mill which reduces approximately 50% of the particles to less than 50 microns. This milled suspension is classified in a weir-type centrifugal classifier and the lighter particles with sieve size less than 50 micron collected for use. Analysis of this 18-21% solids suspension by photosedimentometer and disc centrifuge reveals approximately 40% particles having a size ("equivalent spherical diameter") of 0.4-1.0 micron. The solids content of the suspension is readily adjusted by adding water to it or removing water from it.

EXAMPLE 1

7.5 cm square plates of 22 SWG (approx 1 mm thick) of aluminium sheet were sanded to clean, bare metal and lightly sprayed from an aerosol container with an aqueous suspension (isopropyl alcohol: water equals 45:41.5) of vermiculite lamellae of solids content 3.5% by weight. The suspension was applied thinly to one side of the plates so as just to form a continuous coating over the surface of the plates. The coatings were allowed to stand in air for 1 hour to partially dry them and the coated plates were then heated in an oven at 60° C. for 20 minutes. The thickness of the dry coating was determined (after the flame test described below) as 13.5 microns. The coating adhered firmly to the surface of the aluminium.

The coated plates were then placed one at a time in a bunsen burner flame at a height of 50 mm above the top of the bunsen and with the vermiculite coating lowermost, i.e. towards the flame. The flame temperature at the point where the sample was inserted was determined as 1100° C. (±20° C.). In a series of such flame tests on the samples it was observed that the vermiculite coatings became blackened and charred and blistered but remained intact, and the aluminium was not melted by the flame for a period of from 1.5 hours (minimum observed) to 2 hours.

For purposes of comparison similar plates which had not been coated with vermiculite lamellae were also subjected to the flame test as (minimum observed) to 2 hours.

For purposes of comparison similar plates which had not been coated with vermiculite lamellae were also subjected to the flame test as described. These untreated plates melted rapidly and were penetrated by the flame in a period of from 1 to 2 minutes. It was observed that in the case of the untreated plates it made little or no difference whether or not the plates were first sanded to clean, bare metal.

EXAMPLE 2

A wooden batten of cross-section approximately 1.2 cm×1.8 cm was coated thinly and uniformly on all sides with a suspension of vermiculite lamellae of solids content 3.5% by spraying from an aerosol container as described in Example 1. The coating was allowed to dry in air for 24 hours and the coated batten was then held in a bunsen burner flame.

Flames spread on the surface of the coating over a small area around the bunsen flame as gases generated within the wood passed through the vermiculite coating and ignited. The flames did not spread appreciably from the locality of the bunsen flame and the wood within the vermiculite coating did not burn, although it became charred by the heat generated by the bunsen flame. Upon removal of the batten from the flame the fire self-extinguished. The area of the coating contacted by the bunsen flame and over which flames had spread was charred and blackened, but the coating remained intact.

EXAMPLE 3

One surface of a clean (sanded) mild steel bar of approximate dimensions 28 cm×4 cm×1 mm thick was coated by brushing with an 18.4% solids content vermiculite slurry. The coating was dried in air at ambient temperature for 1 hour then at 60° C. in an oven for 20 minutes. The bar was supported, coating downwards, at each end and a load of 24 000 kg/sq meter was applied downwardly at its centre.

A bunsen burner was placed 50 mm beneath the central portion of the bar (with the vermiculite coating towards the flame). The bar slowly sagged under the applied load, producing an angle of sag (the angle between the arms of the sagging bar) of 175° in 1.5 minutes, after which the angle of sag remained unchanged during a further 10 minutes period of heating the bar.

For purposes of comparison a similar but untreated mild steel bar was subjected to the same sag test. The bar sagged rapidly to produce an angle of sag of 120° after only 2 minutes; the time to an angle of sag of 175° was less than 1 minute.

EXAMPLE 4

An absorbent paper (47 g/m²) was impregnated with a 4% solids vermiculite lamellae suspension and dried in air overnight. The vermiculite loading was 15.1 g/m².

A 220 mm×100 mm sample of the coated paper was placed in the flame from a calor gas burner fitted with a circular jet of diameter 40 mm, at a height of 30 mm above the burner jet. The flame temperature at the sample point was determined as 1075° C. The paper exhibited a slight localized surface spread of flame after 5 seconds but the flames extinguished almost immediately. The resulting paper, though burned to char, remained structurally intact and was still providing an integral fire barrier, with no cracks, after 3 minutes.

By way of comparison, a sample of the untreated paper was burned through in less than 2 seconds in the 1075° C. gas-flame to leave a soft, powdery residue.

EXAMPLE 5

Two small samples (15 m×10 mm) of a mild steel panel were degreased with trichloroethylene, dried in air and allowed to stand in the open air for several weeks, after which they were heavily rusted. The heavy rust deposits on both samples was removed by light abrasion with sand paper so that rusted but fairly smooth surfaces were produced. All abraded surfaces were matched as closely as possible. The samples were weighed.

One of the samples, Sample A, was double-coated on all sides with an 18.5% aqueous suspension of vermiculite lamellae (using firstly a Meyer bar and secondly a brush-coating technique). The coated sample was dried at 70° C. for 12 hours, after which the dry, coated sample was weighed.

The coated Sample, A, and the untreated Sample, B, were both subjected to an accelerated rusting test in which the samples were immersed in salt spray in a cabinet for 1 week. At the end of this test the samples were dried and weighed.

The coated Sample, A, showed a small number of reddish surface blemishes but there was no sign of pitting or corrosion of the metal and the surfaces were not coated with rust. By contrast, the surfaces of the untreated Sample, B, were severely rusted and carried a heavy reddish crust and the surface facing the salt-spray showed severe pitting corrosion. The weight change in sample A was determined as −0.064%, i.e. a slight loss in weight, whilst the weight change in Sample B was determined as +0.982%, i.e. a gain in weight, these weight changes indicating the absence of rusting of Sample A and the severe rusting of Sample B.

EXAMPLE 6

Two identical aluminium plates were degreased and sanded to bare metal and brush-coated with 20% w/w aqueous suspensions of vermiculite. One plate was coated with a suspension of vermiculite lamellae wet-classified to below 50 microns as described in the general procedure recited herein immediately before the Examples. The other panel was coated, for purposes of comparison, with a 20% w/w aqueous suspension of the particles of vermiculite of size greater than 50 microns rejected by the wet-classification stage of the process described in the general procedure, i.e. the "heavies" from the suspension production procedure. The coated panels were dried at 70° C. for 12 hours.

The coating produced using the classified suspension of vermiculite lamellae was seen to be a good, uniform, consistent (coherent) coating which was firmly adhered to the aluminium plate such that it was not removed upon lightly abrading the coating with sandpaper.

The coating produced using the suspension of larger vermiculite particles ("heavies") was by comparison extremely poor. It was found to be difficult to apply a consistent (coherent) coating of this suspension due to aggregation of the vermiculite particles and difficulty in "wetting" the surface of the aluminium. The coating produced was uneven and lumpy, and it was readily completely removed by light abrasion with sandpaper.

EXAMPLE 7

A clean (degreased and sanded) aluminium panel was brush-coated with a 10% w/w aqueous suspension of vermiculite lamellae wet-classified to below 50 microns and dried at 70° C. for 12 hours. A good, consistent coating was produced which was not removed when lightly abraded with sandpaper.

For purposes of comparison, a clean aluminium panel was coated with an aqueous suspension of vermiculite particles obtained by milling heat-exfoliated vermiculite granules. The heat-exfoliated vermiculite granules (200 g) were milled in distilled water (3l) in a Silverson mixer for 15 minutes to produce a slurry of fine vermiculite particles. The slurry was classified using a 50 micron sieve and then was evaporated to dryness. 19.6 g of vermiculite particles were obtained (representing a milling efficiency of 9.8%). These particles were added to de-ionised water (176.4 g) and mixed to produce a suspension of 10% w/w solids content.

Attempts to brush-coat the aluminium panel with this suspension were unsuccessful since it was found to be impossible to "wet" the surface of the aluminium adequately. 3 drops (approx 0.1 g) of a solution of a fluorochemic surface active agent, "Monflor" 31, were added to the suspension which then could be brush-coated onto the aluminium panel. The coated panel was dried at 80° C. for 12 hours and the coating was found to be consistent and of good appearance; however, the coating was readily completely removed by light abrasion with sandpaper.

EXAMPLE 8

A piece of glassfibre scrim was laid over the surface of an aluminium panel (15 cm×10 cm) and the scrim was brush-coated with a 10% w/w aqueous suspension of vermiculite lamellae (classified to below 50 microns). The assembly was hot-pressed using a hot domestic iron so that the suspension was squeezed into and through the glassfibre scrim to the scrim/aluminium interface. The laminate was dried at 70° C. for 2 hours and then was placed in a bunsen burner flame at a distance of 6 cms above the bunsen burner. The laminate was placed with the impregnated glassfibre surface towards the flame, the temperature of which at the sample point was determined as about 1100° C. Neither of the glassfibres and the aluminium panel melted over a period of 15 minutes in the flame, after which time the laminate was removed from the flame and allowed to cool. There was no visible evidence of the coating having blistered or of delamination having occurred during the test.

By contrast, a similar aluminium panel (uncoated) melted in the flame and was penetrated by the flame within a period of 3 minutes, as also did a piece of the untreated fibreglass scrim.

We claim:

1. An article which comprises a coated aluminum substrate characterized in that the coating consists essentially of an inorganic layer of chemically delaminated vermiculite in which the lamellae have a thickness of less than 0.5 micron and an aspect ratio of at least 100, and substantially all of the lamellae are of a size below 50 microns.

2. An article as claimed in claim 1 in which the coating is of a thickness below 50 microns.

3. An article as claimed in claim 1 in which the coating is of a thickness below 10 microns.

4. An article as claimed in claim 1 in which the coating comprises at least 35% by weight based on the coating of lamellae of size from 0.4 micron to 5 microns.

5. An article as claimed in claim 1 in which the vermiculite lamellae thickness is less than 0.05 micron.

6. An article as claimed in claim 5 in which the vermiculite lamellae thickness is less than 0.005 micron.

7. An article as claimed in claim 1 in which the vermiculite lamellae have an aspect ratio of at least 1,000.

8. An article as claimed in claim 1 in which the vermiculite lamellae are less than 0.05 micron thick and have an aspect ratio of at least 1,000.

* * * * *